United States Patent [19]

Ocken et al.

[11] Patent Number: 4,710,657
[45] Date of Patent: Dec. 1, 1987

[54] SEMI ENCLOSED ALTERNATOR

[75] Inventors: Alfred G. Ocken, Franklin Park; Raymond E. Nordbrock, St. Charles, both of Ill.

[73] Assignee: Motorola, Inc., Schaumburg, Ill.

[21] Appl. No.: 906,570

[22] Filed: Sep. 9, 1986

Related U.S. Application Data

[63] Continuation of Ser. No. 06/738,140, May 24, 1985.

[51] Int. Cl.$^4$ .............................................. H02K 9/02
[52] U.S. Cl. .................................. 310/62; 310/68 D; 310/89
[58] Field of Search ............... 29/596, 526 R; 310/52, 310/58, 60 R, 60 A, 68 R, 68 D, 88, 89, 54, 62

[56] References Cited

U.S. PATENT DOCUMENTS

| | | | |
|---|---|---|---|
| 4,286,186 | 8/1981 | Hagenlocher et al. | 310/68 D |
| 4,288,712 | 9/1981 | Hagenlocher et al. | 310/68 D |
| 4,465,948 | 8/1984 | Oyama et al. | 310/62 |
| 4,540,381 | 9/1985 | Molloy et al. | 310/62 |

FOREIGN PATENT DOCUMENTS 1544204  4/1979  United Kingdom .................. 310/62

Primary Examiner—Peter S. Wong
Assistant Examiner—D. L. Rebsch
Attorney, Agent, or Firm—Phillip H. Melamed

[57] ABSTRACT

An inexpensive semi enclosed alternator provides high power prolonged operation in environments having particle contamination in the ambient atmosphere. An alternator housing has front and rear housing portions, and a drive shaft carrying a rotor assembly is within the housing. A drive shaft extension from the housing holds a fan assembly. The rear housing portion has cylindrical sidewalls joined to a closed end portion 27 and forms an air sealed cavity except for an open end facing the front housing portion. The front housing portion comprises cylindrical sidewalls, having through-openings therein, which terminate in a first end opening 31, facing rear housing open end 28, and a substantially open second end opening 30 facing the fan assembly and the ambient atmosphere. Preferably rotor and stator assemblies, and rectifying diodes, are positioned within the housing substantially between the through openings and the closed end portion of the rear housing. During normal drive shaft rotation, the fan assembly draws cooling ambient air into the housing through the through-openings 33, and this air is then drawn out of the housing through the second end opening 30 of the front housing portion. This causes cooling air turbulence within the housing, while not directly exposing most internal alternator components to particle contamination in the ambient atmosphere. A voltage regulator is provided in a sealed protective cavity external to the internal cavity. A heatsink which is part of the voltage regulator is utilized to form part of the walls that create the protective cavity.

27 Claims, 5 Drawing Figures

SEMI ENCLOSED ALTERNATOR

CROSS REFERENCE TO RELATED APPLICATIONS

The present invention is related to the invention described in copending U.S. patent application Ser. No. 738,142, filed May 24, 1985, entitled, "Alternator Conductive Plate Mounting Structure", by Alfred G. Ocken and Raymond J. Kowieski, and assigned to the same assignee as the present invention.

BACKGROUND OF THE INVENTION

The present invention is related to alternators, and more specifically to alternators which are intended for operation in agricultural or industrial construction environments.

For alternators used in agricultural or industrial construction environments, in addition to typically requiring a high alternator output, the alternator must be constructed to withstand the potential hostile ambient atmosphere which may surround the alternator. This hostile ambient atmosphere will typically include dust contaminating particles, and, in the case of agricultural environments, other particle debris such as wheat or corn chaff, for example.

Because of the hostile environments in which these alternators must operate, the alternator construction conventionally used in automobile vehicles has been found not to be suitable. This is because in conventional alternator construction, a fan assembly is used to provide cooling of the alternator rectifying diodes and stator and rotor assemblies by implementing air flow through the entire alternator which has an outer protective housing. Thus the typical alternator housing will comprise effectively open rear and front housing portions joined together with a fan assembly mounted on an end of the alternator drive shaft to insure air flow past all alternator components positioned within the housing. When such an alternator is subject to particle contamination in the ambient atmosphere surrounding the housing, this results in pulling the contaminents, for example dust particles, into the alternator housing and having the contaminents build up on components within the alternator and effectively choke off the air circulation which was required. This air circulation is needed for the alternator to provide its rated output without overheating. Also particle contamination can adversely affect the alternator drive shaft bearings if they are not sufficiently protected. The end result is that the alternator, if not protected by frequent cleaning, would overheat due to insufficient air cooling and incur a catastrophic failure of either the rotor, stator, rectifying diode or voltage regulator subassemblies, or other components. Thus, continuous high power output operation of such alternators for relatively long durations was not possible.

In order to provide an alternator which could continuously operate under the extreme environment which may exist in agricultural or industrial construction usage, several prior modifications of the conventional alternator structure have been proposed. However, all of these modifications have proved unacceptable for one reason or another. One of these previous methods comprises providing particle or debris screens to prevent debris from entering the alternator housing and covering the stator and rotor windings, and rectifying diodes, wherein if these elements are covered by particles, air cooling is prevented and a failure may occur. The problem with the use of such debris screens is that these screens will frequently clog due to the debris which they are screening out, and only by frequently cleaning these screens can heat related failures be prevented. Thus this solution is totally unacceptable since its only advantage is making it somewhat easier to periodically clean the alternator, by cleaning just the screen, when it is operated in an hostile environment, rather than allowing the alternator to properly continuously operate for long durations in a hostile environment.

Another proposed solution is to totally enclose all of the alternator critical parts within a substantially air closed alternator housing. However, when such a solution is implemented, it has been found that with no air cooling the power output of these alternators must be regulated to a relatively low magnitude, or heat related failures will occur due to overheating of the alternator components. In addition, these designs incur the additional expense of a substantial number of gaskets which are required to keep all dust and other particle contaminents away from the alternator critical elements. Thus continuous operation was provided, but only at a reduced output level.

Since clearly cooling of the alternator structure was desired, another design has been proposed which involves totally enclosing all of the alternator critical components within an outer housing, and then providing oil cooling for the housing and alternator components. This solution is extremely expensive since it requires a substantial amount of oil conduit tubing and pressurized gasketing for the tubing, and it requires implementing a pressure driven oil flow. Thus an extremely expensive alternator is the end result of this oil cooled totally enclosed design, but at least an alternator with a high output and capable of continuously operating for long durations in an extremely hostile environment was provided.

SUMMARY OF THE INVENTION

An object of the present invention is to provide an improved alternator which overcomes the above mentioned deficiencies of prior alternators by providing a relatively low cost alternator capable of continuous high output power operation for long durations in a hostile ambient environment where particle contaminents such as dust or agricultural chaff may be present.

In one embodiment of the present invention such an alternator is provided. This alternator, which is suitable for agricultural or industrial construction use in which an atmosphere surrounding the alternator may have particle contaminants, comprises: an alternator outer housing having front and rear housing portions joined together; an alternator drive shaft coupled to the housing and having a first drive shaft portion positioned within the housing and a second drive shaft portion axially extending from said first portion and extending outward from and beyond at least the front housing portion, said drive shaft being rotatable with respect to the housing about a drive shaft axis; a rotor assembly mounted on the first drive shaft portion and positioned within the outer housing; a stator assembly mounted to and inside the outer housing for electrical/magnetic cooperation with the rotor assembly; rectifying diode means secured to said outer housing and rectifying an AC output of at least one of said stator and rotor assemblies and providing an alternator output signal in response to said rectified output; wherein the improvement comprises, said rear housing portion, at least after assembly of the alternator, having a generally cylindrical outer shape comprising substantially cylindrical sidewalls joined to a closed end portion and having an opposite open end facing said front housing portion, said rear housing cylindrical sidewalls and closed end portion forming a substantially air closed internal cavity except for said open end, said rear housing cylindrical sidewalls being generally concentric with respect to said shaft axis; said front housing portion having a generally tubular outer shape comprising generally cylindrical sidewalls generally concentric with respect to said shaft axis, said front housing cylindrical sidewalls effectively terminating at substantially open first and second end openings, said first end opening facing said rear housing open end and said second end opening providing an opening to the ambient atmosphere surrounding said alternator, said drive shaft second portion axially extending outward from and beyond said front housing portion; and fan assembly means mounted on said drive shaft and positioned concentrically about said axis and mounted external to said front housing portion, said second front housing end opening facing said fan assembly means, said fan assembly means, during normal driven rotation of said drive shaft, providing for air flow in a direction out of said second front housing end opening.

Preferably, the alternator front housing cylindrical walls will have through openings therein providing for the fan assembly to draw air into the alternator through the openings in the front housing cylindrical walls with the drawn in air being drawn out of the alternator through the second end opening of the front housing portion which faces the fan assembly. In addition, preferably the rectifying diode means are mounted entirely within the internal cavity of the rear housing portion with the stator and rotor assemblies at least partially disposed within the alternator rear housing internal cavity, and the stator and rotor assemblies axially positioned along said drive shaft axis between the front housing cylindrical wall through openings and the rear housing closed end portion. With the above recited preferred construction, the air drawn into the alternator housing through the cylindrical wall through openings will pass through the alternator housing without being substantially impeded by directly contacting the stator or rotor assemblies or the rectifying diode assembly. Thus particle contamination of these assemblies is minimized while the air flow path causes sufficient turbulence within the alternator housing to provide effective cooling of these components without subjecting them to particle contamination. This enables the present invention to provide an inexpensive alternator having a relatively high output and which is capable of prolonged continuous use in a particle contaminated atmosphere.

Preferably the driveshaft has a third extending portion axially extending through the rear housing closed end portion and having commutating ring assemblies on the end of this third portion. Brush assemblies are positioned outside the rear housing internal cavity and mounted to the rear housing portion for cooperation with the commutating rings. Similarly, a voltage regulator assembly is positioned outside the alternator internal cavity and electrical feedthrough connections are provided through the rear housing end portion to couple the voltage regulator assembly to the stator assembly for controlling alternator field coil excitation in accordance with sensed alternator output. The alternator rear housing portion has extending walls which form a protective cavity for the brush and voltage regulator assemblies and which mate with a cover plate which effectively seals this protective cavity with respect to the ambient atmosphere surrounding the alternator.

The above features and advantages of the present invention, as well as additional features and advantages, are more fully explained in the subsequent description of the preferred embodiments of the invention.

BRIEF DESCRIPTION OF THE DRAWINGS

For a more complete understanding of the present invention, reference should be made to the drawings, in which.

DESCRIPTION OF THE PREFERRED EMBODIMENT OF THE INVENTION

Figure 1:
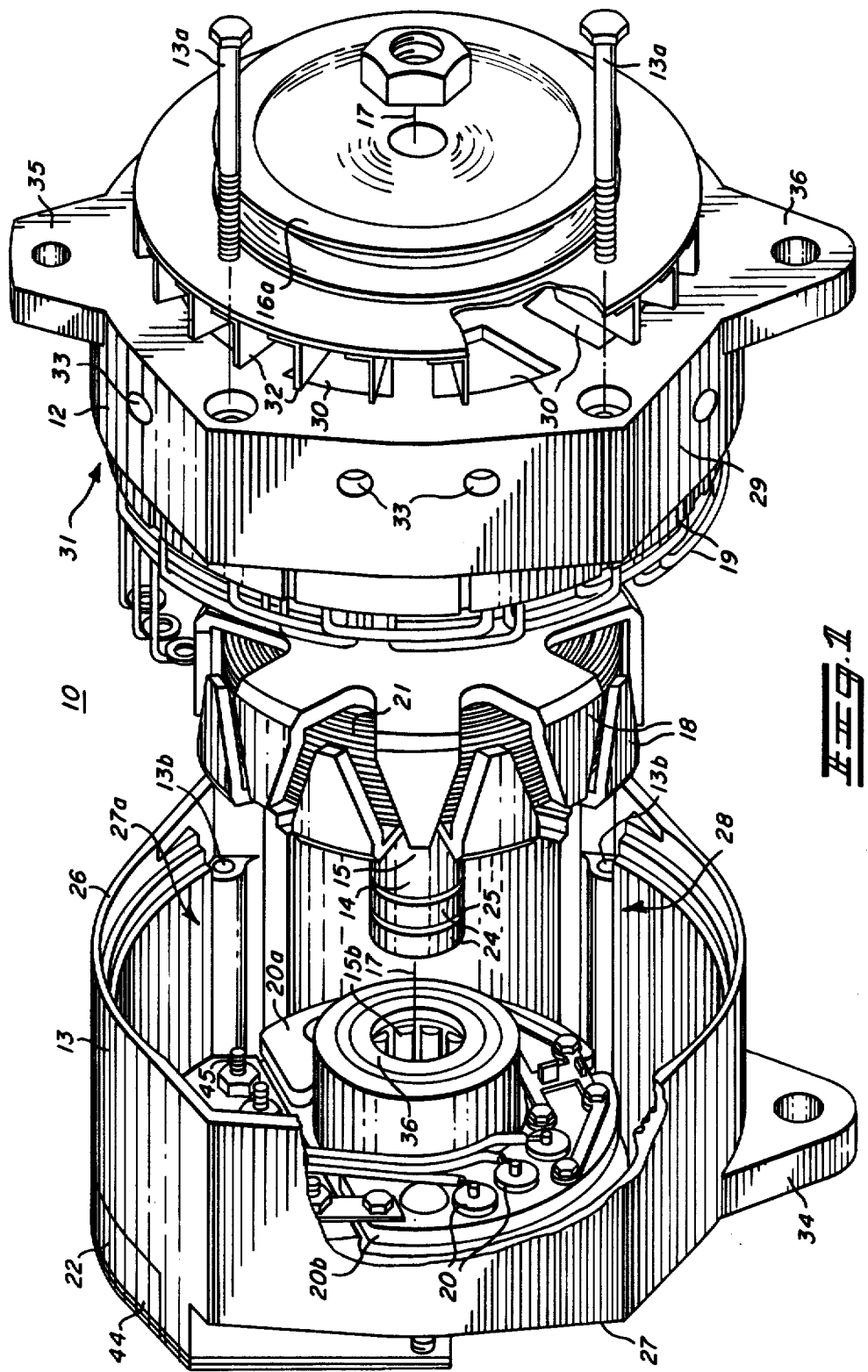
FIG. 1 is an exploded perspective view, with a portion cut away, of an alternator constructed in accordance with the present invention.

Referring to FIG. 1, an alternator 10 is illustrated which is suitable for agricultural or industrial construction use, in which an ambient atmosphere surrounding the alternator may have particle contaminants. In FIG. 1, and in other figures, some components are not shown so as to maintain drawing clarity. The alternator 10 includes an alternator outer housing 11 having a front housing portion 12 joined to a rear housing portion 13 by a plurality of bolts 13a which mate with receiving holes 13b in the rear housing portion 13. The alternator outer housing 11 essentially provides mechanical protection for alternator components located within the alternator housing.

An alternator drive shaft 14 is coupled to the housing 11 and has a first drive shaft portion 15 positioned within the alternator housing 11 and a second drive shaft portion 16 axially extending from said first portion 15 and extending outward from and beyond at least the front housing portion 12. The drive shaft 14 is rotatable with respect to the alternator outer housing 11 about a drive shaft axis 17 which corresponds to a linear longitudinal axis of the first and second drive shaft portions 15 and 16. The drive shaft portion 15 is supported by bearing assemblies 15a and 15b in the front and rear housing portions 12 and 13, respectively.

A rotor assembly 18, preferably of the conventional claw pole type configuration, is mounted on the first drive shaft portion 15, rotatable with the drive shaft and positioned within the alternator outer housing 11. A stator assembly 19, including stationary stator windings 19a preferably wound to produce a three phase AC alternator output, is mounted to the alternator outer housing 11 and is fixed with respect to the housing and positioned within the alternator housing for electrical/mechanical cooperation with the rotor assembly. A plurality of rectifying diodes 20 is also secured to the outer housing 11 via positive and negative diode plates 20a and 20b, and the diodes 20 rectify the three phase AC output signals provided by the stator assembly 19 so as to provide a rectified DC alternator output signal.

Figure 5:
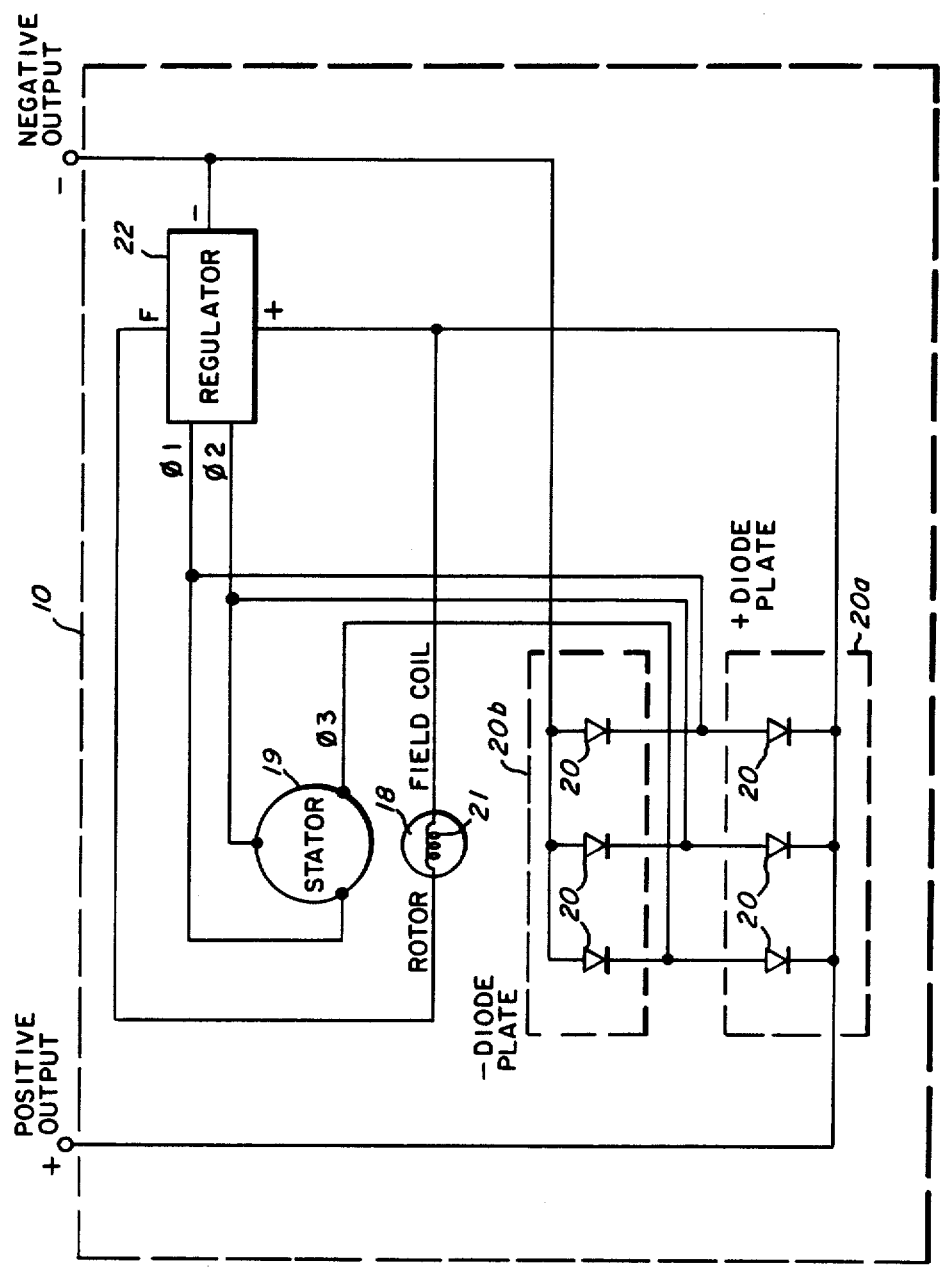
FIG. 5 is an electrical schematic diagram of the alternator in FIG. 1.

In general, the alternator drive shaft is belt driven by a belt (not shown) coupled to a pulley 16a which is attached to a portion of the second drive shaft portion 16. In accordance with the rotation of the drive shaft, the rotor assembly 18 is rotated in synchronism therewith and excitation to a field coil 21, which is part of the rotor assembly, is provided by a voltage regulator 22 coupled to the field coil by virtue of a brush assembly 23 and commutating rings 24 which are provided on a third drive shaft portion 25. In response to field coil excitation and the rotation of the rotor assembly 18, three phase AC voltages are induced into the stator windings 19a, and these signals are then rectified by the rectifying diodes 20 to provide a rectified DC output. The voltage regulator 22 senses the magnitude of this rectified output in order to control the amount of field coil excitation. The electrical configuration of the alternator is shown in FIG. 5.

In prior alternators, cooling of the components within the alternator housing was of primary concern, such that the fan assembly and alternator housing were constructed to provide direct axial air flow parallel to the drive shaft axis and along the entire axial length of the portion of the drive shaft within the alternator housing. Thus both the front and rear housings were axially open. However, as was noted above, such construction, in a particle contaminated atmosphere, caused heat related failures of the alternator unless the amount of alternator output was significantly reduced below its maximum capacity or unless various expensive or ineffectual protective measures were taken. The present invention provides for an inexpensive high power alternator suitable for continuous operation in ambient atmospheres having particle contamination or contaminated by agricultural chaff or other debris. This is accomplished in accordance with the following additional structural limitations provided for by the present invention.

The alternator rear housing portion 13, at least after assembly of the alternator, has a generally cylindrical outer shape comprising substantially cylindrical sidewalls 26 joined to a closed end portion 27 and having a opposite open end 28 facing said front housing portion 12. Said rear housing cylindrical sidewalls 26 and the closed end portion 27 form a substantially air closed internal cavity 27a except for the open end 28, and the rear housing cylindrical sidewalls 26 are generally concentric with respect to the drive shaft axis 17.

The front housing portion 12 has a generally tubular outer shape comprising generally cylindrical sidewalls 29 which are generally concentric with respect to the drive shaft axis 17. The front housing cylindrical sidewalls 29 effectively terminate at substantially open front and rear end openings 30 and 31, respectively. The rear end opening 31 of the front housing portion 12 faces the rear housing open end 28, and the front end opening 30 provides an opening to the ambient atmosphere surrounding the alternator 10. The drive shaft second portion 16 axially extends outward from and beyond said front housing portion 12 and a fan assembly 32 is mounted on the drive shaft 14 and positioned concentrically about the drive shaft axis 17. The fan assembly is also mounted external to said front housing portion 12 with said front end opening 30 facing said fan assembly. With this configuration the fan assembly, during the normal driven rotation of the drive shaft 14, will provide for an air flow in a direction out of said front housing portion 12 by virtue of the front end opening 30. It has been found that this creates a turbulent air flow within the alternator housing with this turbulent air flow providing cooling of all of the alternator components positioned within the alternator housing. This occurs even though the rear housing portion 13 is substantially air closed except for open end 28. In addition, by providing for an air flow such as discussed above, ambient atmosphere particle contaminents which may be present in the atmosphere surrounding the alternator will not be substantially drawn into the alternator housing. Thus the contaminents will not be brought into contact with the components within the alternator housing. Therefore the chance of ambient particle contaminents building up on critical alternator components is minimized.

To assist in providing a proper turbulent air flow within the alternator housing, while still minimizing the exposure of the alternator critical components to particle contaminents, a plurality of through openings 33 are provided on the front housing cylindrical walls 29. These through openings 33 permit entrance of ambient air therethrough while the fan assembly 32, during normal driven rotation of the drive shaft 14, draws this ambient air out of the front housing portion through the front end opening 30 which faces the fan assembly. This increases the amount of turbulent air flow within the alternator housing while still minimizing the exposure of critical components, such as a rotor and stator assemblies and rectifying diodes, to particle contaminents.

Figure 2:
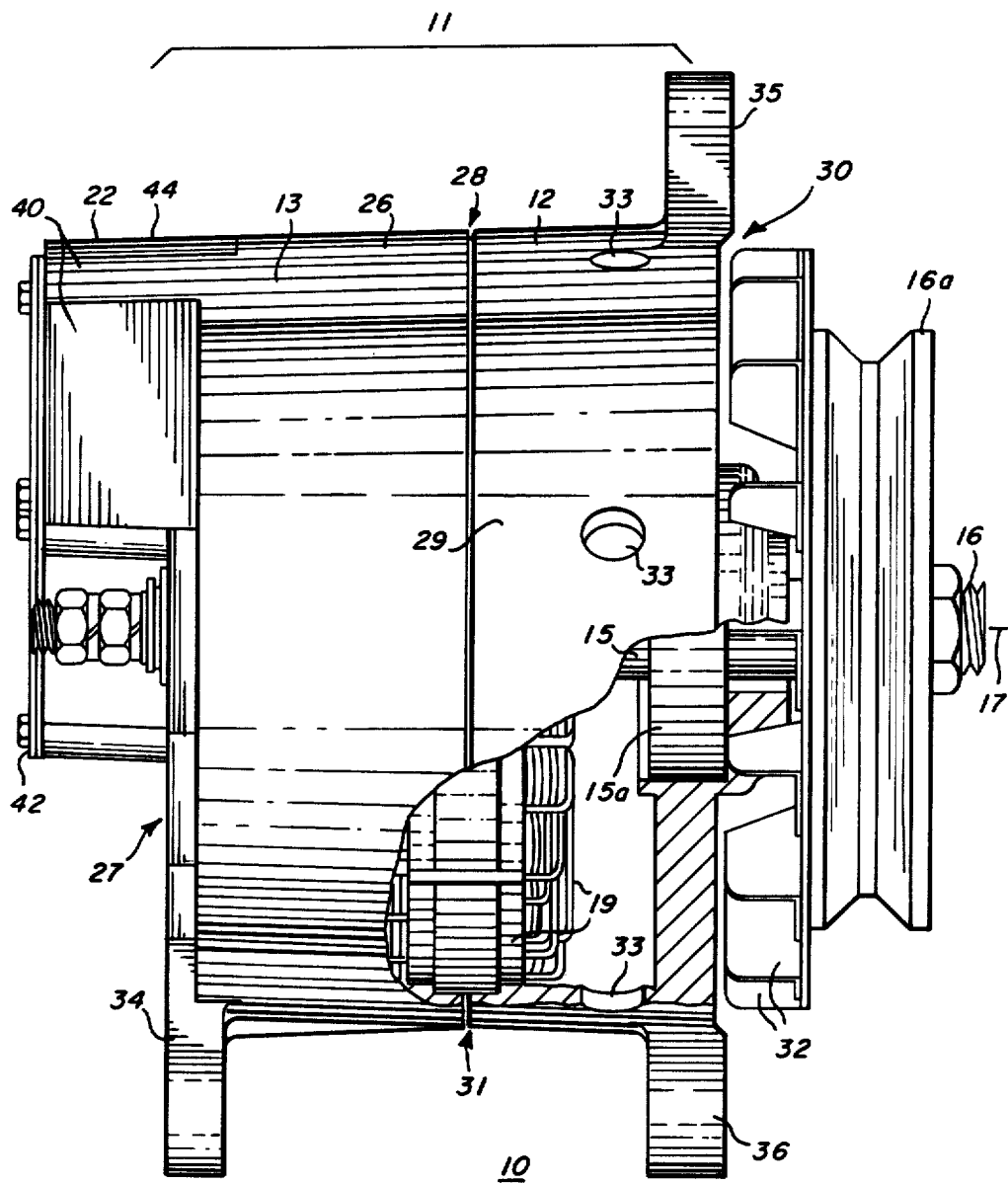
FIG. 2 is a side view, with a section cut away, of the assembled alternator shown in FIG. 1.
Figure 3:
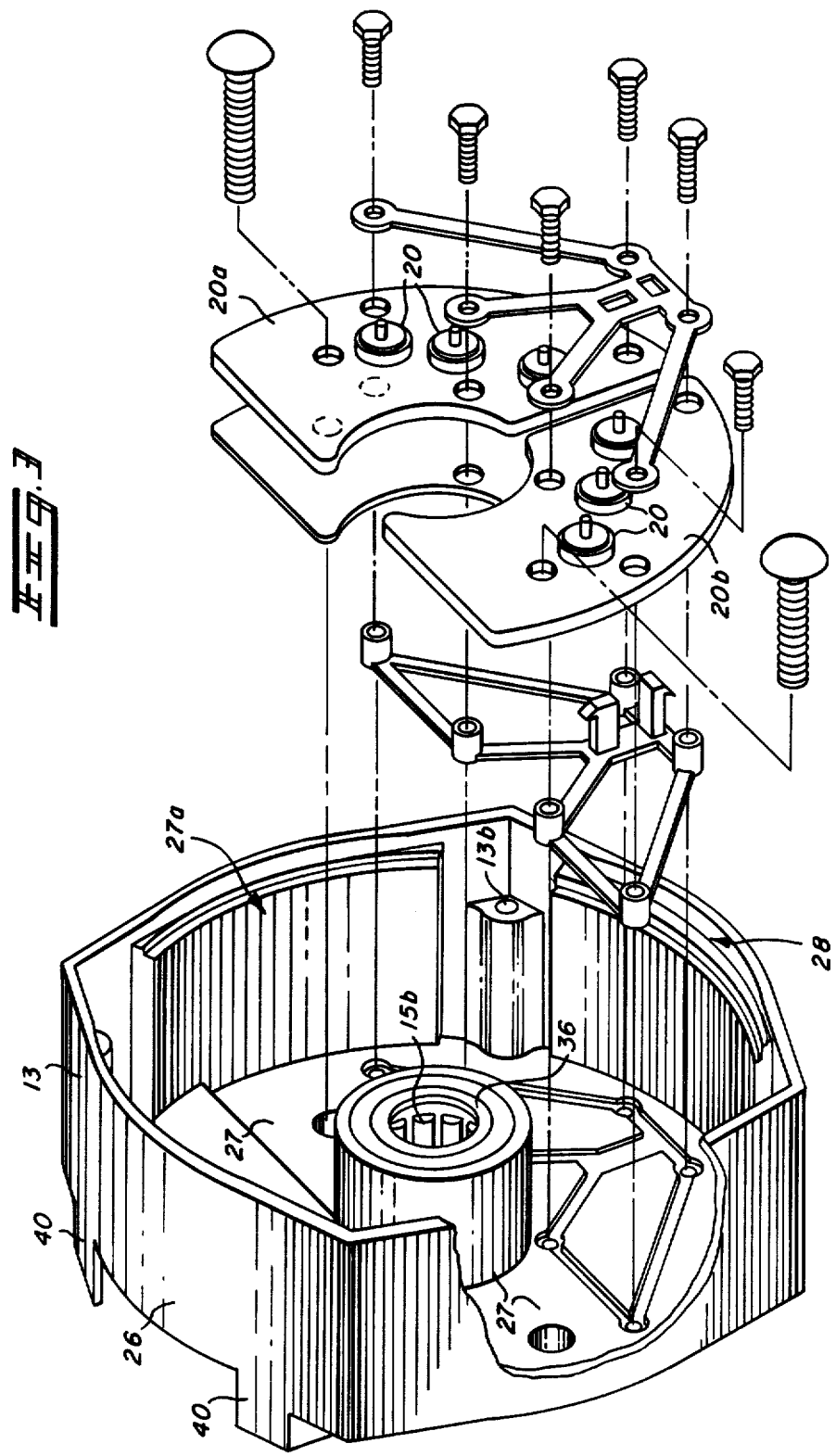
FIG. 3 is an exploded perspective view, with a portion cut away, of an internal subassembly comprising part of the alternator shown in FIG. 1.
Figure 4:
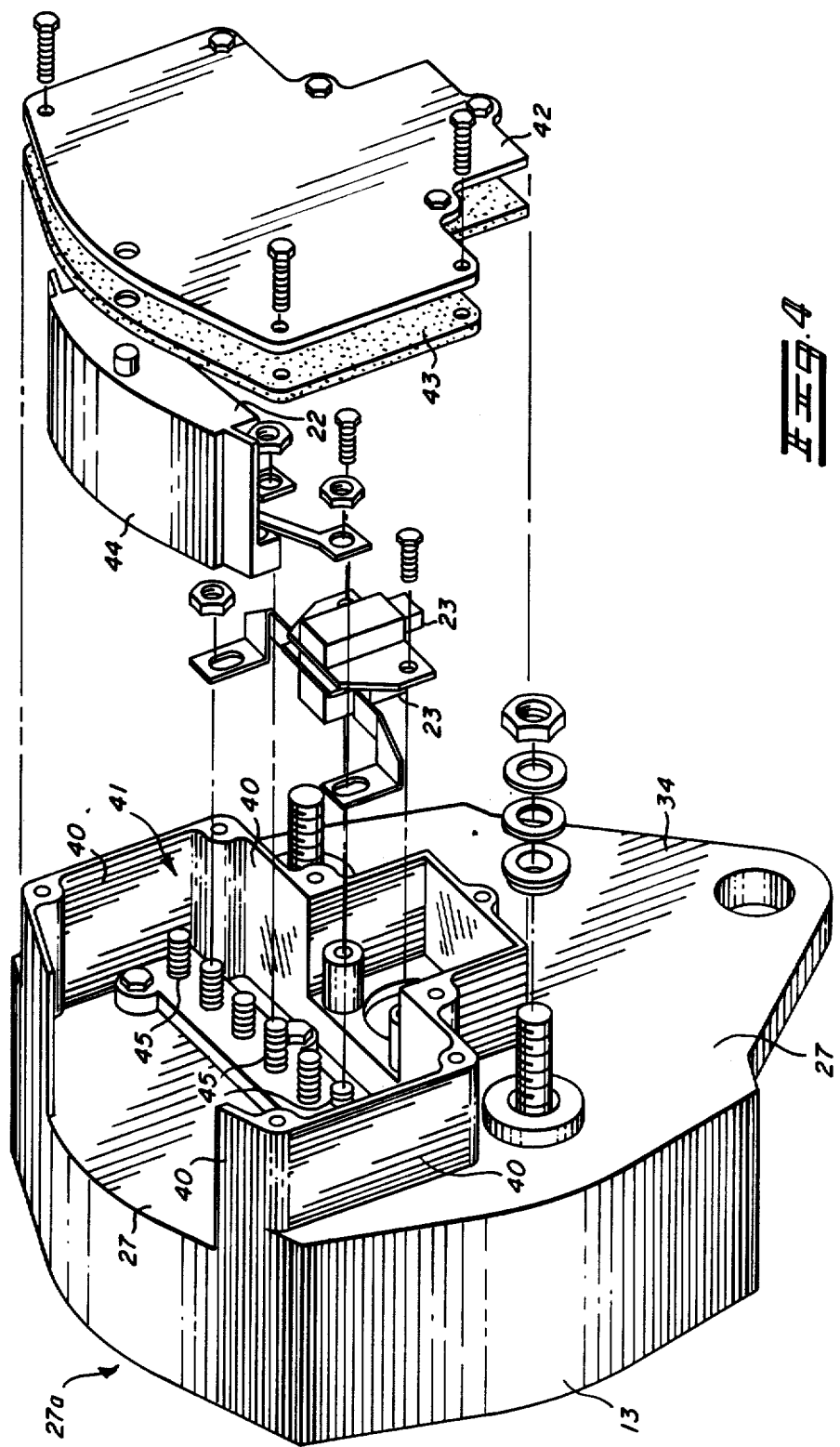
FIG. 4 is an exploded perspective end view of an end subassembly of the alternator in FIG. 1.

Preferably, the rectifier diodes 20 are mounted substantially entirely within the internal cavity 27a formed by the rear housing portion 13. Also the stator assembly 19, comprising the stator windings 19a, is at least partially disposed within the alternator rear housing portion 13 so as to prevent particle contamination thereof. In addition, both the stator assembly 19 and rotor assembly 18 are axially positioned along the drive shaft axis 17 between the front housing cylindrical wall through openings 33 and the rear housing closed end portion 27 (see FIG. 2). This insures providing a substantially unimpeded air flow path from the through hole openings 33 to the front end opening 30 of the front housing portion 12. Thus with this configuration a substantial ambient atmosphere air flow path is provided, but the stator and rotor assemblies and the rectifying diodes are not directly in this air flow path and are cooled instead by air turbulence indirectly created by the primary air flow path. With this configuration there is no direct exposure to particle contamination of critical components since ambient particles drawn into the alternator housing through the through holes 33 are then immediately drawn out of the alternator housing through the front end opening 30.

It should be noted that when the present invention describes the general outer shape of the front and rear housing portions as being cylindrical, this includes any variations from of a true cylindrical shape since all generally similar shapes would operate in substantially the same manner. Of course the "generally cylindrical" wording certainly does not rule out having housing mounting structures such as a rear housing mounting projection 34 and front housing mounting projections 35 and 36 as shown in the drawings. These projections in no way affect the inner shape of the alternator housing.

It should be noted that each of the alternator front and rear housing portions 12 and 13 include the drive shaft bearing assemblies 15a and 15b, respectively, for rotatably supporting the alternator drive shaft. The assembly 15b is provided in the rear housing closed end portion 27. Gaskets 36 are provided with said rear housing portion 13 and effectively surround the alternator drive shaft bearing assembly 15b to effectively air seal the bearing assembly and the rear housing closed end portion 27 after assembly of the drive shaft 14 in the alternator. This is significant since it prevents the fan assembly 32 from drawing air through the closed end portion 27 by virtue of the rear bearing assembly 15b.

It should be noted that the alternator drive shaft third extending portion 25 axially extends through the alternator rear housing closed end portion 27 so as to provide the commutating rings 24 external to the internal cavity 27a of the rear housing portion 13. These commutating rings, as was previously noted, cooperate with the brush assembly 23 which is secured to the alternator rear housing portion 13 but disposed external to the internal cavity 27a. In addition, the voltage regulator 22 is similarly secured to the rear housing portion 13 and positioned external to the internal cavity 27a with the voltage regulator electrically connected to the stator and rotor assemblies for controlling alternator field excitation in accordance with the sensed alternator output.

Preferably the alternator rear housing portion 13 has extending walls 40 which substantially form a protected cavity 41, outside the internal cavity 27a, in which the brush assembly 23, the commutating rings 24 and the voltage regulator 22 are provided. The protective cavity 41 is substantially effectively air sealed by a cover plate 42 and gasket 43 with respect to the ambient atmosphere surrounding the alternator so as to provide for minimizing particle contamination of the brush assembly, the commutating rings and voltage regulator. The voltage regulator 22 comprises an electrical module which is heat conductively secured to a metallic heatsink plate 44 which forms a housing for the voltage regulator, and which also forms part of the extending walls 40 that create the protective cavity 41. The voltage regulator is affixed to the alternator rear housing portion 13, as is the brush assembly 23. Electrical connections of the voltage regulator to the stator assembly 19 and diodes 20 are provided by electric feedthroughs 45 which pass through the alternator rear housing closed end portion 27. At least one of these feedthroughs is electrically isolated from the alternator rear housing closed end portion, which is preferably metallic.

During initial testing of the above described alternator structure it was noted that while sufficient air cooling of the rectifier diodes 20 and rotor and stator assemblies was provided, if the voltage regulator 22 were also provided within the internal cavity 27a, sufficient air cooling and heat sinking of the regulator was not achieved. Thus, in order to obtain improved cooling of the voltage regulator 22, the assembly was located external to the internal cavity 27a of the rear housing portion 13. In addition, so as to provide sufficient cooling for the voltage regulator, the heatsink 44 on which the regulator circuitry is mounted was oriented so as to become part of the extended exposed outer walls 40 of the rear housing portion 13 which form the protected cavity 41. Since the voltage regulator 22 was now brought outside of the internal cavity 27a, the commutating rings and brush assembly were also brought outside and provided in the same protective cavity. To insure particle noncontamination of these components, the cover plate 42, gasket 43 and extending walls 40 of the rear housing portion 13 were constructed so as to form the protective cavity 41 and effectively air seal it.

Preferably one of the mounting screws which mount the plates 20a and 20b can have an elongated body which extends through a clearance hole in the closed end portion 27 and is electrically isolated therefrom, preferably by an end cap. A lock washer and nut assembly is used to hold this screw in place. A metal lug is positioned between the head of this screw and a washer plate and makes electrical connection to the screw and one of the diode terminals. In this manner an AC phase tap signal can be provided external to the housing 11, similar to the feedthroughs 45. Also, preferably the voltage regulator 22 may be mounted to the rear housing portion prior to the mounting of the brush assembly 23.

While specific embodiments of the present invention have been shown and described further modifications and improvements will occur to those skilled in the art. All such modifications and improvements which retain the basic underlying principles disclosed and claimed herein are within the scope of this invention.

We claim:

1. An alternator suitable for agricultural or industrial construction use in which an atmosphere surrounding the alternator may have particle contaminants, comprising:

an alternator outer housing having front and rear housing portions joined together;

an alternator drive shaft coupled to the housing and having a first drive shaft portion positioned within the housing and a second drive shaft portion axially extending from said first portion and extending outward from and beyond at least the front housing portion, said drive shaft being rotatable with respect to the housing about a drive shaft axis;

a rotor assembly mounted on the first drive shaft portion and positioned within the outer housing;

a stator assembly mounted to and inside the outer housing for electrical/magnetic cooperation with the rotor assembly;

rectifying diode means secured to said outer housing and rectifying an AC output of at least one of said stator and rotor assemblies and providing an alternator output signal in response to said rectified output;

wherein the improvement comprises, said rear housing portion, at least after assembly of the alternator, having a generally cylindrical outer shape comprising substantially cylindrical sidewalls joined to a closed end portion and having an opposite open end facing said front housing portion, said rear housing cylindrical sidewalls and closed end portion forming a substantially air closed internal cavity except for said open end, said rear housing cylindrical sidewalls being generally concentric with respect to said shaft axis;

said front housing portion having a generally tubular outer shape comprising generally cylindrical sidewalls generally concentric with respect to said shaft axis, said front housing cylindrical sidewalls effectively terminating at substantially open first and second end openings, said first end opening facing said rear housing open end and said second end opening providing an opening to the ambient atmosphere surrounding said alternator, said drive shaft second portion axially extending outward from and beyond said front housing portion; and fan assembly means mounted on said drive shaft and positioned concentrically about said axis and mounted external to said front housing portion, said second front housing end opening facing said fan assembly means, said fan assembly means, during normal driven rotation of said drive shaft, providing for air flow in a direction out of said second front housing end opening.

2. An alternator according to claim 1 wherein said front housing cylindrical walls have through-openings therein for permitting entrance of ambient air which surrounds said alternator housing, said fan assembly means, during normal driven rotation of said drive shaft, drawing ambient air through said front housing through-openings and out said second end opening of said front housing portion which faces said fan assembly means, whereby cooling of alternator components within said alternator housing is accomplished while minimizing the exposure of these components to particle contaminents which may be present in the ambient atmosphere.

3. An alternator according to claim 2 wherein said rectifying diode means are mounted substantially entirely within said internal cavity formed by said rear housing portion.

4. An alternator according to claim 3 wherein said stator assembly comprises stator windings at least partially disposed within said alternator rear housing portion so as to prevent contamination thereof by ambient atmosphere particle contaminents.

5. An alternator according to claim 4 wherein said stator assembly and said rotor assembly are axially positioned along said drive shaft axis between said front housing cylindrical wall through-openings and said rear housing closed end portion, thereby providing a substantially unimpeded air flow path through said alternator front housing portion.

6. An alternator according to claim 5 wherein each of said alternator rear and front portions comprise bearing assemblies for rotatably supporting said alternator drive shaft, and wherein at least said rear housing portion has a gasket means surrounding said alternator drive shaft bearings to effectively air seal the bearing assembly and the rear housing closed end portion.

7. An alternator according to claim 6 wherein said alternator drive shaft first portion has a third extending drive shaft portion which axially extends through said alternator rear housing closed end portion, and wherein on the third drive shaft portion commutating ring assemblies coupled to said rotor assembly are provided.

8. An alternator according to claim 7 which includes a brush assembly secured to said alternator rear housing portion and disposed external to said internal cavity and positioned adjacent and in electrical contact with ring assemblies on said drive shaft.

9. An alternator according to claim 8 which includes a voltage regulator assembly secured to said rear housing portion and positioned external to said internal cavity, said voltage regulator assembly electrically connected to said stator and rotor assemblies for controlling alternator field excitation in accordance with sensed alternator output.

10. An alternator according to claim 9 wherein said closed end portion of said rear housing portion has extending walls which substantially form a protective cavity, outside said internal cavity, in which said brush assembly and voltage regulator assembly are provided, said protective cavity being substantially sealed by a cover plate means with respect to the ambient atmosphere surrounding said alternator.

11. An alternator according to claim 10 wherein said voltage regulator assembly comprises an electrical module affixed to the alternator rear housing portion, the module including a heat conductive metallic heat sink plate which forms part of the extending walls that form said protective cavity.

12. An alternator according to claim 11 which includes at least one electrically conductive feedthrough between said voltage regulator assembly and said stator/rotor assemblies, said feedthrough passing through said rear housing closed end portion and electrically isolated therefrom.

13. An alternator according to claim 11 wherein said drive shaft and said first and second shaft portions have a common longitudinal axis which corresponds to said axis of rotation.

14. An alternator according to claim 1 wherein said drive shaft and said first and second shaft portions have a common longitudinal axis which corresponds to said axis of rotation.

15. An alternator according to claim 2 wherein said stator assembly and said rotor assembly are axially positioned along said drive shaft axis between said front housing cylindral wall through-openings and said rear housing closed end portion, thereby providing a substantially unimpeded air flow path through said alternator front housing portion.

16. An alternator according to claim 15 wherein each of said alternator rear and front housing portions comprise bearing assemblies for rotatably supporting said alternator drive shaft, and wherein at least said rear housing closed end portion has a gasket means surrounding one of said alternator bearing assemblies to effectively air seal the bearing assembly and the rear housing closed end portion.

17. An alternator according to claim 16 wherein said alternator drive shaft first portion has a third extending drive shaft portion which axially extends through said alternator rear housing closed end portion, and wherein on the third drive shaft portion commutating ring assemblies coupled to said rotor assembly are provided.

18. An alternator according to claim 17 which includes a brush assembly secured to said alternator rear housing portion and disposed external to said internal cavity and positioned adjacent and in electrical contact with ring assemblies on said drive shaft.

19. An alternator according to claim 18 which includes a voltage regulator assembly secured to said rear housing portion and positioned external to said internal cavity, said voltage regulator assembly electrically connected to said stator and rotor assemblies for controlling alternator field excitation in accordance with sensed alternator output, and wherein said closed end portion of said rear housing portion has extending walls which substantially form a protective cavity, outside said internal cavity, in which said brush assembly and voltage regulator assembly are provided, said protective cavity being substantially sealed by a cover plate means with respect to the ambient atmosphere surrounding said alternator.

20. An alternator suitable for agricultural or industrial construction use in which an atmosphere surrounding the alternator may have particle contaminants, comprising:
an alternator outer housing having front and rear housing portions joined together;
an alternator drive shaft coupled to the housing and having a first drive shaft portion positioned within the housing and a second drive shaft portion axially extending from said first portion and extending outward from and beyond at least the front housing portion, said drive shaft being rotatable with respect to the housing about a drive shaft axis;
a rotor assembly mounted on the first drive shaft portion and positioned within the outer housing;
a stator assembly mounted to and inside the outer housing for electrical/magnetic cooperation with the rotor assembly;
rectifying diode means secured to said outer housing and rectifying an AC output of at least one of said stator and rotor assemblies and providing an alternator output signal in response to said rectified output;
wherein the improvement comprises,
said rear housing portion, at least after assembly of the alternator, having a generally cylindrical outer shape comprising substantially cylindrical sidewalls joined to a closed end portion and having an opposite open end facing said front housing portion, said rear housing cylindrical sidewalls and closed end portion forming a substantially air closed internal cavity except for said open end, said rear housing cylindrical sidewalls being generally concentric with respect to said shaft axis;
said front housing portion having a generally tubular outer shape comprising generally cylindrical sidewalls generally concentric with respect to said shaft axis, said front housing cylindrical sidewalls effectively terminating at substantially open first and second end openings, said first end opening facing said rear housing open end and said second end opening providing an opening to the ambient atmosphere surrounding said alternator, said drive shaft second portion axially extending outward from and beyond said front housing portion; and
fan assembly means mounted on said drive shaft and concentrically about said axis and mounted external to said front housing portion, said second front housing end opening facing said fan assembly means, said fan assembly means, during normal driven rotation of said drive shaft, providing for air flow in a direction out of said second front housing end opening;
wherein said front housing cylindrical walls have through openings therein for permitting entrance of ambient air which surrounds said alternator housing, said fan assembly means, during normal driven rotation of said drive shaft, drawing ambient air in through said front housing sidewall openings and out said second end opening of said front housing portion which faces said fan assembly means, whereby cooling of alternator components within said alternator housing is accomplished while minimizing the exposure of these components to particle contaminents which may be present in the ambient atmosphere;
wherein said rectifying diode means are mounted substantially entirely within said internal cavity formed by said rear housing portion;
wherein said stator assembly comprises stator windings at least partially disposed within said alternator rear housing portion so as to prevent contamination thereof by ambient atmosphere particle contaminents;
wherein said stator assembly and said rotor assembly are axially positioned along said drive shaft axis between said front housing cylindral wall through openings and said rear housing closed end portion, thereby providing a substantially unimpeded air flow path through said alternator front housing portion; and
wherein said drive shaft and said first and second shaft portions have a common longitudinal axis which corresponds to said axis of rotation.

21. An alternator according to claim 2 wherein said through-openings are oriented radially in said front housing cylindrical walls with respect to said drive shaft axis.

22. An alternator according to claim 2 wherein said stator assembly comprises stator windings at least partially disposed within said alternator rear housing portion so as to prevent contamination thereof by ambient atmosphere particle contaminants.

23. An alternator according to claim 22 wherein said stator assembly and said rotor assembly are axially positioned along said drive shaft axis substantially between said first front housing cylindrical wall through-openings and said rear housing closed end portion, thereby providing a substantially unimpeded air flow path through said alternator front housing portion.

24. An alternator according to claim 23 wherein said rectifying diode means are mounted substantially entirely within said internal cavity formed by said rear housing portion.

25. An alternator suitable for agricultural or industrial construction use in which an atmosphere surrounding the alternator may have particle contaminants, comprising:
an alternator outer housing having front and rear housing portions joined together;
an alternator drive shaft coupled to the housing and having a first drive shaft portion positioned within the housing and a second drive shaft portion axially extending from said first portion and extending outward from and beyond at least the front housing portion, said drive shaft being rotatable with respect to the housing about a drive shaft axis;
a rotor assembly mounted on the first drive shaft portion and positioned within the outer housing;
a stator assembly mounted to and inside the outer housing for electrical/magnetic cooperation with the rotor assembly;
rectifying the diode means secured to said outer housing and rectifying an AC output of at least one of said stator and rotor assemblies and providing an alternator output signal in response to said rectified output;
wherein the improvement comprises,
said rear housing portion, at least after assembly of the alternator, having a generally cylindrical outer shape comprising substantially cylindrical sidewalls joined to a closed end portion and having an opposite open end facing said front housing portion, said rear housing cylindrical sidewalls and closed end portion forming a substantially air closed internal cavity except for said open end, said rear housing cylindrical sidewalls being generally concentric with respect to said shaft axis;

said front housing portion having a generally tubular outer shape conprising generally cylindrical sidewalls generally concentric with respect to said shaft axis, said front housing cylindrical sidewalls effectively terminating at substantially open first and second end openings, said first end opening facing said rear housing open end and said second end opening providing an opening to the ambient atmosphere surrounding said alternator, said drive shaft second portion axially extending outward from and beyond said front housing portion;

fan assembly means mounted on said drive shaft and positioned concentrically about said axis and mounted external to said front housing portion, said second front housing end opening facing said fan assembly means, said fan assembly means, during normal driven rotation of said drive shaft, providing for air flow in a direction out of said second front housing end opening; and a voltage regulator assembly secured to said rear housing portion and positioned external to said internal cavity, said voltage regulator assembly electrically connected to said stator and rotor assemblies for controlling alternator field excitation in accordance with sensed alternator output;

wherein said closed end portion of said rear housing portion has extending walls which substantially form a protective cavity, outside said internal cavity, in which said voltage regulator assembly is provided, said protective cavity being substantially sealed by a cover plate means with respect to the ambient atmosphere surrounding said alternator.

26. An alternator according to claim 25 wherein said voltage regulator assembly comprises an electrical module affixed to the alternator rear housing portion, the module includes a heat conductive metallic heat sink plate which forms part of the extending walls that form said protective cavity.

27. An alternator according to claim 26 which includes at least one electrically conductive feedthrough between said voltage regulator assembly and said stator/rotor assemblies, said feedthrough passing through said rear housing closed end portion and electricaly isolated therefrom.

* * * * *

UNITED STATES PATENT AND TRADEMARK OFFICE
CERTIFICATE OF CORRECTION

PATENT NO. : 4,710,657

DATED : December 1, 1987

INVENTOR(S) : Alfred G. Ocken and Raymond E. Nordbrock

It is certified that error appears in the above-identified patent and that said Letters Patent is hereby corrected as shown below:

Claim 2, column 9, line 16, after "housing", please insert --into said housing--.

Claim 23, column 12, line 28, after "said", please delete --first--.

Claim 25, column 13, line 4, please delete "conprising" and insert --comprising--.

Signed and Sealed this

Twenty-first Day of June, 1988

Attest:

DONALD J. QUIGG

Attesting Officer

Commissioner of Patents and Trademarks